United States Patent
Keuchel et al.

(10) Patent No.: US 7,803,459 B2
(45) Date of Patent: Sep. 28, 2010

(54) NON-FIBROUS ADHESIVE MATRIX AND LAMINATE FORMED THEREFROM

(76) Inventors: Herbert Willie Keuchel, 446 Buttevant Dr., Munroe Falls, OH (US) 44262; Kenneth Keuchel, 154 Brookrun Dr., Copley, OH (US) 44321

( * ) Notice: Subject to any disclaimer, the term of this patent is extended or adjusted under 35 U.S.C. 154(b) by 458 days.

(21) Appl. No.: 10/350,707

(22) Filed: Jan. 24, 2003

(65) Prior Publication Data

US 2004/0209093 A1    Oct. 21, 2004

(51) Int. Cl.
*B32B 7/12*    (2006.01)
*B32B 3/26*    (2006.01)

(52) U.S. Cl. .................. 428/343; 428/304.4; 428/346

(58) Field of Classification Search .............. 428/304.4, 428/343, 346
See application file for complete search history.

*Primary Examiner*—Victor S Chang
(74) *Attorney, Agent, or Firm*—Andrew F. Sayko, Jr.

(57) ABSTRACT

A laminate comprising at least one non-fibrous adhesive layer positioned between a plurality of substrates, the non-fibrous adhesive layer comprising a stereo reticulated, continuous, non-fibrous matrix formed from a polymeric material. A process for producing such a stereo reticulated non-fibrous adhesive matrix comprising: a) blending an adhesive polymer with a blowing agent, b) melting the adhesive polymer/blowing agent blend while passing the molten polymer/blowing agent blend through an extruder to a shaping die and thereby producing a non-fibrous extrudate, c) cooling, drawing and orienting the non-fibrous extrudate, and thereby producing a continuous, stereo reticulated non-fibrous adhesive matrix.

6 Claims, 4 Drawing Sheets

Infrared Bonding System to Produce Shaped Articles Using A
Stereoreticulated Co-Polyamide Adhesive Matrix.

Figure 2 Contour Bonding Press

Infrared Bonding System to Produce Shaped Articles Using A Stereoreticulated Co-Polyamide Adhesive Matrix.

Continuous Fusing Press

NON-FIBROUS ADHESIVE MATRIX AND LAMINATE FORMED THEREFROM

BACKGROUND OF THE INVENTION

1. Field of the Invention

The present invention relates to a non-fibrous stereo reticulated matrix that is produced from an elastomeric, moisture absorbing polyester or polyamide block-copolymer and blends thereof with other polymers, and which finds particular utility in forming a multi-layer laminate. Such a multi-layer laminate includes a composite comprising one or more layers of a woven or non-woven fabric, a foam structure, films including barrier layers and semi-porous films, absorptive substrates, etc. Such laminates may be used for fabricating shoe components, filters, comfort wear, lingerie and other intimate apparel, interior automotive parts, etc. These laminates find particular use in making garments, such as women's undergarments, including brassieres.

2. Description of the Prior Art

In a laminating process two or more structures are bonded to each other into one composite structure called a laminate. The bonding media that adheres the substrates to each other can be, for example, a solvent adhesive, a water base adhesive or a hot melt adhesive. Hot melt adhesives are available in many different forms and can be applied in a number of different ways. Utilizing hot melt pool technology, a molten coating is applied onto a substrate, and the molted adhesive bonds that substrate to a second substrate. In dry powder processes, a dry powdered adhesive is applied onto the substrate, the substrate is heated to melt the adhesive, and the molten adhesive bonds that substrate to another. The dry web method utilizes a dry web of an adhesive material that is positioned between the substrates to be bonded, the substrates are then heated to melt the adhesive web, and the molten adhesive bonds the two substrates.

The use of fabric laminates and other reinforcing materials in materials suitable for making garments is known in the prior art. See, for example, U.S. Pat. No. 5,447,462 (Smith et al), which discloses a stretch fabric laminate comprising one or more fabric layers formed from elastomeric yarn. In addition, U.S. Pat. Nos. 4,701,964 (Bell et al) and 4,776,916 (Prunesti et al) both disclose the use of a powdered adhesive applied by silk screening as an elastomeric adhesive layer in a multi-layer fabric laminate useful for forming women's undergarments.

The prior art contains numerous examples of laminated fabrics secured together by a variety of adhesive materials. However, these adhesive materials are either discrete adhesive materials, fibrous woven or non-woven fabrics, or non-woven webs that are characterized by a fibrous structure. The use of a stereo reticulated non-fibrous matrix provides a comparable adhesive layer without the constraints of a spinneret, a loom or other fabric-forming machine. It also eliminates the requirement to bond fibers together that is required to provide a useable non-woven fabric structure that is useful as an adhesive layer. Such bonding is normally achieved by melt bonding or adhesive bonding of the fibers, or by fiber entanglement.

In addition, the use of the stereo reticulated non-fibrous matrix of the present invention enables the production of laminates utilizing a much wider range of polymers. This is because adhesive layers may be used that comprise polymers that are difficult, if not impossible, to form into fibrous structures. Thus, laminates can be produced at higher manufacturing speeds, having an easily achievable greater thickness, and lower manufacturing costs, for the production of laminates, such as those that are used to make garments such as women's undergarments.

SUMMARY OF THE INVENTION

The present invention relates to a laminate comprising at least one non-fibrous adhesive layer positioned between a plurality of other substrates (layers), the non-fibrous adhesive layer comprising a stereo reticulated non-fibrous matrix formed from a polymeric material. The substrates that are laminated may comprise at least one fibrous layer. The stereo reticulated, non-fibrous matrix is a continuous integral structure wherein a multitude of tissue-like branches join together to comprise the non-fibrous matrix. The non-fibrous matrix is formed from a polymeric material, wherein the polymeric material is preferably an elastomer. The elastomer may be a polyamide, a polyester, a blend of a polyamide and a polyester, or a blend of one or more of such elastomers with one or more other polymers.

The laminate of the present invention comprises at least one non-fibrous adhesive layer positioned between a plurality of substrates, the non-fibrous adhesive layer comprising a stereo reticulated, continuous, non-fibrous matrix formed from a polymeric material. The stereo reticulated, continuous non-fibrous matrix is preferably an integral structure wherein a multitude of tissue-like branches are joined together to provide integrity to the non-fibrous matrix. The cellular or stereo reticulated non-fibrous matrix is defined as an integral web wherein a multitude of tissue-like branches are joined together to thereby provide integrity to the non-fibrous matrix.

In the subject laminate the substrates may comprise at least one fibrous layer, or at least one of the substrates may comprise Neoprene foam, an elastomeric fabric, or a membrane or film. Such a membrane is preferably a moisture-transmitting membrane or film. The continuous non-fibrous matrix is preferably formed from a polymeric material such as an elastomer, which may be an a polyamide, a polyester, or a blend of one or more of such elastomers.

The present invention also provides a process for producing a stereo reticulated non-fibrous adhesive matrix comprising: a) blending an adhesive polymer with a blowing agent, b) melting the adhesive polymer/blowing agent blend while passing the molten polymer/blowing agent blend through an extruder to a shaping die and thereby producing a non-fibrous extrudate, c) cooling, drawing and orienting the non-fibrous extrudate, and thereby producing a continuous, stereo reticulated non-fibrous adhesive matrix. The polymer/blowing agent blend is normally passed through the extruder and then through an annular extrusion die. The process preferably further comprising forming a multi-layer laminate by: a) positioning the stereo reticulated non-fibrous adhesive matrix between two substrates to be laminated to form an unbonded laminate, b) heating the unbonded laminate of a) to a temperature above the melting temperature of the adhesive polymer, and thereby forming a bonded multi-layer laminate. The substrates (layers) to be laminated preferably comprise at least one fibrous layer.

The multi-layer laminate is preferably subjected to a molding cycle, which laminate can be formed to enable the production of a shaped article having bonding areas of different bond intensity and compaction. The non-fibrous adhesive matrix utilized in the present process preferably comprises a moisture-absorbing polymer such as a thermoplastic polyester elastomer which is a copolyester comprising a crystalline polybutylene terephthalate hard segment with an amorphous glycol soft segment, wherein the major component of the copolyester is preferably butylene/poly (alkylene ether) phthalate. The moisture-absorbing polymer may also comprise a poly (ether-amide) block polymer comprising rigid polyamide segments and flexible polyether segments linked together in regular, linear chains, or a blend of a thermoplastic polyester elastomer which is a copolyester comprising a crystalline polybutylene terephthalate hard segment with an amorphous glycol soft segment and a poly (ether-amide) block polymer comprising rigid polyamide segments and flexible polyether segments linked together in regular, linear chains.

Among the preferred polyesters is Hytrel® thermoplastic polyester elastomer from Dupont, which is based on copolyester chemistry. It comprises a crystalline polybutylene terephthalate hard segment with an amorphous glycol soft segment. The major component is butylene/poly (alkylene ether) phthalate. Among the preferred polyamides is PEBAX® poly (ether-amide) block polymer. Structurally, the PEBAX® products comprise rigid polyamide segments and flexible polyether segments linked together in regular, linear chains. Both polymer types are water absorbing; thereby increasing comfort when incorporated into apparel and other garments.

Neoprene is difficult to bond utilizing a dry adhesive, such as a fabric, a film or an adhesive powder. Adhesives dissolved in a suitable solvent are frequently utilized. However, because the solvent is most often an organic solvent, the release into the environment of such a solvent should be avoided. This usually requires the use of additional, often expensive equipment. The use of the process and fabricate laminate of the present invention is an effective and inexpensive method of addressing this problem.

Another effective application of the process and laminate of the present invention is in bonding permeable, semi-permeable and vapor-transmitting membranes or films to a fabric. Such fabric laminates are frequently used for making garments such as medical gowns and for use in the production of shoes. Such fabric laminates comprise an elastic moisture-transmitting adhesive bonding a moisture-transmitting membrane or film to provide a breathable fabric laminate. Such breathable fabrics fund extensive use in manufacturing uniforms for military or safety personnel. The use of such a polymeric matrix improves the resultant laminates in many ways, such as: 1) facilitating stretch in the resulting laminate by virtue of its elastomeric properties, and 2) imparting moisture absorption by virtue of its chemical properties. Other elastomers, such as a polyurethane, can be prone to yellow and oxidize in air, are not as wash resistant, especially in chlorinated hydrocarbons, and are not known to be especially water absorbing.

The non-fibrous stereo reticulated matrix of interconnected tissue-like branches is produced from a polymeric adhesive material that is preferably elastomeric, such as a polyamide, a polyester, a blend of one or more of these elastomers, or a blend of one or more of these elastomers with one or more other polymers. The non-fibrous matrix of the present invention is to be distinguished from a nonwoven fibrous web, which has a structure of individual fibers that are interwoven in an identifiable repeating manner. The subject non-fibrous matrix is also characterized by excellent moisture absorption and moisture transmitting properties. Therefore, when the non-fibrous stereo reticulated matrix of the present invention is utilized as the adhesive layer to secure together other layers, such as a fabric (woven) or non-woven fibrous layer to form the desired multi-layer laminate, it is particularly useful in making products such as garments with enhanced moisture, absorption and permeability.

A suitable elastomeric material for forming the non-fibrous matrix of the present invention includes polymeric materials such as block, random, graft, and alternating copolymers, terpolymers, tetrapolymers, etc. and blends thereof. An elastomeric material is defined as one that upon the application of force is stretchable in a given direction to at least 50% (preferably 100%, more preferably 200%) of its original dimension and which upon the release of such force will recover at least 40% of its stretch, preferably at least 95%. The use of such elastomeric materials to form the adhesive layer of the present invention enables such an adhesive layer to also function as a support panel for products such as garments, including women's undergarments.

The continuous stereo reticulated non-fibrous adhesive matrix of the present invention is produced by a process wherein a polymer or polymer blend is mixed with a blowing agent, melted and then proceeds through an extruder to a shaping die, which is preferably an annular extrusion die. The extruder utilized is preferably a screw extruder that normally has one or two extruder screws. An extrusion die having an annular opening is preferably mounted at the exit end of the extruder and both the extruder and annular die are heated to a suitable extrusion temperature, above the flow temperature of the polymer or polymer blend. The annular opening in the extrusion die ranges from $15/1000$ to $35/1000$ inches, depending on the rate of extrusion, the size of the expander ring used to expand the annular extrudate, and the desired width of the extruded non-fibrous matrix. The stereo reticulated non-fibrous matrix is drawn from the annular opening in the extrusion die and the diameter thereof is expanded utilizing an expander ring that can have a diameter of from about 2 to 10 times that of the annular opening. The extrudate is attenuated (oriented) as it passes over the expander ring and the stereo reticulated matrix is extended in both the machine and cross-machine direction. This provides a stereo reticulated matrix, which is a continuous integral structure wherein a multitude of tissue-like branches are joined together to provide integrity to the non-fibrous matrix. Soon after exiting the annular die and before passing over the expander ring, the continuous stereo reticulated non-fibrous matrix is cooled, preferably with a room temperature cooling gas, such as air. The cooling gas may be provided through a series of openings positioned adjacent to the exit end of the annular die, positioned in a manner so as to direct the cooling gas in a direction towards 0 to about 1 inch from the annular extrusion-slot of the die. The temperature of the extrudate is preferably cooled down close to its hardening temperature, so as to increase its viscosity. This increase in viscosity allows orientation of the structure to more easily occur.

The continuous stereo reticulated matrix is biaxially oriented because of the expanding ring and the take up speed of the extruded matrix, as compared to the speed of extrusion. Biaxial orientation is required to provide sufficient tensile strength in both the machine and cross-machine directions. The tubular biaxially oriented, stereo reticulated, non-fibrous matrix is then preferably collapsed by passed between nip-rolls and then taken up on a windup roll as a continuous two-ply flat matrix. The extruded matrix is in the form of a tube, which can then be slit to provide a single ply structure, suitable for use as the adhesive layer in a laminate.

The polymer is extruded in the form of a continuous non-fibrous matrix having a very good degree of uniformity in mass distribution, especially on a smaller scale of less than one (1) square inch. The relatively low draw down ratios required are a significant factor in allowing the formation of adhesive layers from polymer systems that are impossible to produce in the form of fiber-derived fabrics. Compared to a solid film adhesive layer, the stereo reticulated non-fibrous adhesive matrix of the present invention is much more able to conform to irregular shapes without puckering and folding. In addition, the non-fibrous matrix of the present invention, when used as the adhesive layer of a multi-layer laminate, allows the stresses produced in the laminating process to be distributed substantially uniformly across the width of the adhesive layer with little or no width loss. Width loss is a serious problem with fibrous adhesive webs because of the necking-in and consequent width loss that normally occurs in the laminating process. Such a width loss for the adhesive layer leads to unbonded edges in the resulting multi-layer laminate.

The extruded non-fibrous matrix is provided with a stereo reticular structure by means of a blowing agent, which was previously mixed with the polymer. In order to obtain such a stereo reticulated non-fibrous matrix, the blowing agent must be added to the polymer prior to extrusion. The blowing agent is preferably dry blended with the polymer prior to melting and extrusion. Various blowing agents known in the prior art may be utilized, as long as they produce or caused to be produced a normally gaseous material, such as nitrogen. The particular blowing agent that should be employed depends, to a great extent, on the particular polymer or polymer blend utilized. The polymer or polymer blend may also contain any of a number of additives well known to those skilled in the art.

The present invention also provides a process for producing a reticulated non-fibrous adhesive layer suitable for use in producing a multi-layer laminate. Such a laminate is produced by positioning the stereo reticulated non-fibrous adhesive layer between a plurality of substrates (layers) that are to be bonded together to from a composite structure. Layers to be bonded include films, foam structures and fibrous woven or non-woven layers. The adhesive layer may be bonded to the other layers utilizing any of a number of methods well known in the prior art.

DESCRIPTION OF THE PREFERRED EMBODIMENTS

Figure 1:
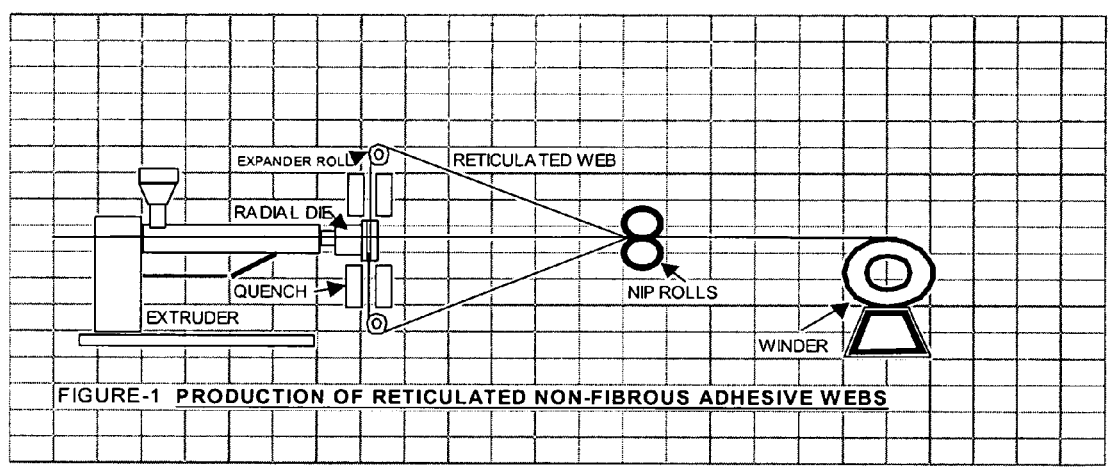
FIG. 1 shows an apparatus for the production of a reticulated non-fibrous adhesive web of the present invention. The apparatus consists of an EXTRUDER having a RADIAL DIE attached thereto and equipped with a QUENCH for cooling the RETICULATED WEB, which is then passed over an EXPANDER ROLL and through two NIP ROLLS and then taken up on a WINDER roll.
Figure 2:
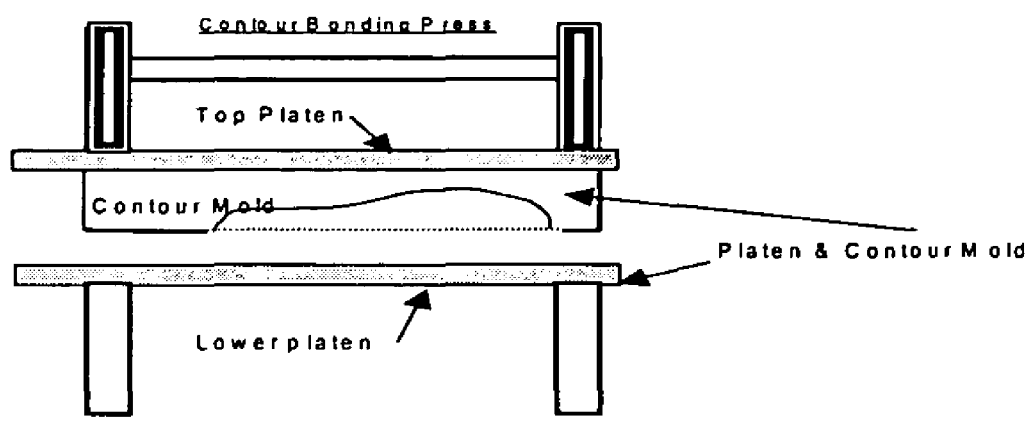
FIG. 2 illustrates a Contour Bonding Press consisting of a CONTOUR MOLD positioned on a TOP PLATEN, and a LOWER PLATEN.

Among the bonding systems that may be utilized to form the laminates of the present invention are an open bonding system, roll bonding or tunnel bonding, or the substrates to be bonded and the adhesive matrix are layered as desired and then molded and bonded in a special press into a custom-contoured shape. If desired, the adhesive layer may be laminated to the other layers, which may then be cut into panels. Alternatively, individual portions of the adhesive layer can be cut for subsequent lamination to the other layers utilized to form the panel.

In addition, a panel may be formed comprising a plurality of stretchable layers between which is applied the non-fibrous adhesive layer of the present invention, which has been produced utilizing an elastomeric polymer or blend of elastomeric polymers. Alternatively, the same adhesive layer may be formed using polymers that have minimal elasticity, but the non-fibrous adhesive layer may be utilized in the form of a regularly repeated, non-continuous pattern generally coextensive with the stretchable layers and substantially uniformly bonded over substantially its full area. In this instance, the pattern of the non-fibrous adhesive layer may comprise an array of aligned individual adhesive layers arranged in successive generally horizontally and vertically extending rows.

Additional support may be desired in specific areas of the composite structure, such as a garment, which may typically be at the stomach, derriere or thigh regions of a panty or pantyhose, as well as the undercup and/or side panels of a brassiere. To achieve this, the adhesive layer of the present invention may be produced utilizing an elastomeric polymer and then laminated to the other layers in the specific areas where additional support is desired. This provides a composite wherein the elastomeric nature of the non-fibrous adhesive layer contributes to achieving the desired additional support. Further, by varying the pattern of the elastomeric adhesive layer on the other layers, the degree of additional support contributed by the non-fibrous adhesive layer can be suitably adjusted, as desired.

The non-fibrous adhesive layer is preferably formed from a thermoplastic polymer or polymer blend, such that when the adhesive layer is applied to the other layers used to form the garment, the adhesive will, upon exposure to a suitable temperature above the melting temperature of the adhesive, be reactivated to adhere the adhesive layer to the other layers, forming the multi-layer laminate of the present invention. The adhesive layer will be confined between the other layers so that in the case of laminating fabric layers the adhesive layer will neither a) adversely affect the hand of the laminate, nor b) lock itself excessively around the fibers or yarn forming the fabric layers.

Typically where the non-fibrous adhesive layer of the present invention comprises an elastomeric material and is used in conjunction with a woman's panty or pantyhose, at least the portion of the adhesive layer secured to the stomach region of the garment will comprise such elastomeric adhesive layer. At that location, an adhesive layer can be used wherein the non-fibrous matrix comprising the adhesive layer has been oriented to provide a greater resistance to stretch in the horizontal than in the vertical direction, thereby serving to restrict the outward projection of the wearer's stomach, to enhance the figure control properties of the garment. Such additional control can also be provided at the thigh and/or derriere region. When used in conjunction with other garments, such an adhesive layer may be located and properly oriented where additional control is desired (e.g. to restrict horizontal stretch at the undercup region of a brassiere). Advantageously, the degree of reinforcement, and hence figure control, that can be provided by the non-fibrous adhesive layer of the present invention can also be suitably adjusted by varying the thickness of the adhesive layer, as well as the characteristics of the particular elastomeric polymers comprising such an adhesive layer.

EXAMPLE 1

Web Production with Poly (Ether-Amide) Block Polymer

| Raw Material: | Pebax ® block polymer supplied by the Elf Atochem Company - 90 parts |
|---|---|
| Processing Aid: | 10 parts |
| Blowing agent: | Azodicarbonamide - 1.0%, by weight based on the weight of polymer and processing aid |
| Mixing: | Raw material and blowing agent were dry-blended in a drum-mixer for 25 minutes. |
| Extrusion System: | Shown in FIG. 1 |
| Extruder: | 1¼-inch standard single-screw extruder |
| Die Type: | Radial, having an extrusion slot diameter of 8.0 inches |
| Quench: | Radial, to accommodate the die |
| Expander Roll: | Diameter of 26.9 inches |
| Nip Roll: | Typical pneumatic nip roll |
| Winder: | Standard textile winder |

Details of Web Production

The freshly mixed blend of raw material was fed into the hopper of the extruder, which was set at a temperature profile to melt the polymer to a melt temperature of about 350° F. A foamed extrudate was extruded from the radial die with simultaneous quenching to form a stereoreticulated extrudate that is further developed while expanding over the 26-inch diameter expansion ring to form a tubular web. The web proceeds down stream, and is collapsed into a flat, two-ply web. The final, stereoreticulated web is 32-inches wide and it is rolled-up on the winder as shown above in FIG. 1.

| Extruder Process Data: | |
|---|---|
| Extrusion temp. [° F.] | 285-310-390 |
| Adapter temp. | 340 |
| Die/lip temp. | 340/330 |
| Screw speed [rpm] | 37 |
| Winder Speed: [ft/min] | 45 |
| Basis Weight of resulting web [gm/meter$^2$] | 30.0 |

Adhesion

The web had excellent adhesion to many substrates, including: PVC, polyurethane, textile fabrics, elastomeric knit fabrics containing Lycra® elastomeric fibers, steel and glass.

EXAMPLE 2

Web Production from Thermoplastic Polyester Elastomer

| Extrusion System: | illustrated in FIG. 1. |
|---|---|
| Raw Material: | Hytrel ® polymer supplied by the Dupont Company - 90 parts |
| Processing Aid: | 10 parts |
| Blowing agent: | Azodicarbonamide - 1.0%, by weight, based on the weight of polymer and processing aid |
| Mixing: | Raw material and blowing agent were dry-blended in a drum-mixer for 25 minutes. |
| Extruder: | 1.25-inch standard single-screw extruder |
| Die Type: | Radial Extrusion Slot die having an 8.0-inch diameter |
| Quench: | Radial, to accommodate the die |
| Expander Roll: | Diameter, 26.0 inches |
| Nip Roll: | Typical pneumatic nip roll |
| Winder: | Typical textile winder |

Details of Web Production

The freshly mixed blend of raw material was fed into the hopper of the extruder that was set at a temperature profile designed to melt the polymer to a melt temperature of about 305° F. A foamed extrudate was extruded from the radial die with simultaneous quenching to form a reticulated extrudate that was further developed while expanding over the 26-inch diameter expansion ring to form a tubular web. The web proceeded down stream, and was collapsed into a flat, two-ply web. The final, stereoreticulated web was 34-inches wide. It was then rolled-up on the winder as shown above in FIG. 1.

| Extruder Process Data: | |
|---|---|
| Extruder Extrusion Temp.: [° F.]: | 315-370-350 |
| Adapter Temp.: | 340 |
| Die/lip Temp.: | 350/330 |
| Screw Speed: [rpm] | 47.2 |
| Winder Speed: [ft/min] | 15 |
| Basis Weight of web: gm/meter$^2$ | 27.0 |

Adhesion

The web had excellent adhesion to many substrates, including: textile fabrics, elastomeric knit fabrics containing Lycra® elastomer fibers, Neoprene, Hypercel, and polyurethane.

EXAMPLE 3

Figure 3:
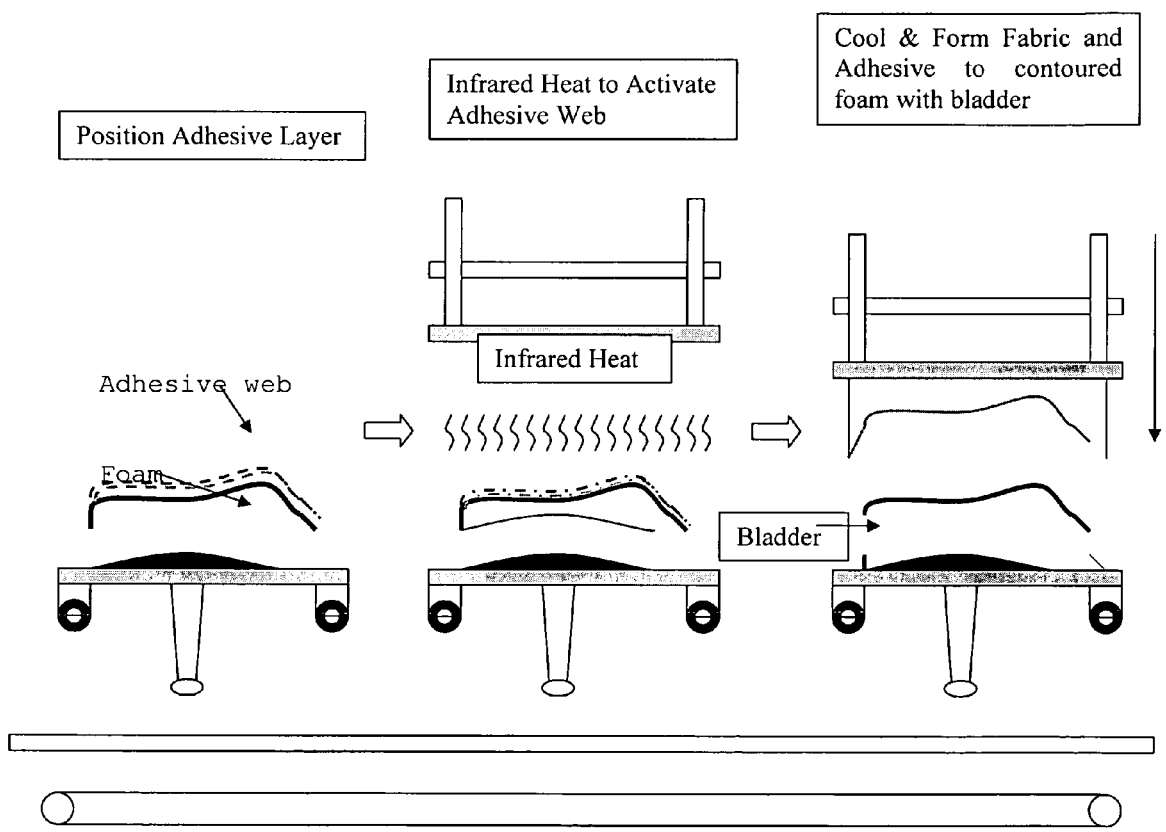
FIG. 3 shows an Infrared heated molding contour press Bonding System to Produce Shaped Articles Using a Stereo-reticulated Adhesive Matrix, wherein an ADHESIVE WEB and moldable FOAM are positioned over a bottom platen, as previously shown in FIG. 2, and then the top platen, as previously shown in FIG. 2 is provided with INFRARED HEAT, which can then be closed using hydraulic pressure, thereby shaping the adhesive web; the web is then cooled to form the fabric with the adhesive web and the contoured foam, utilizing a BLADDER.

Contour Bonding Shaped Articles Using Elastomeric Polyester Copolymer Stereoreticulated Non-Fibrous Matrix as the Adhesive Web A moldable, thermoformable polyurethane foam and a woven polyester (polyethylene terephthalate)/cotton fabric were bonded into a shaped article using as the non-woven adhesive matrix a polyester elastomer copolymer in the form of a stereo reticulated non-fibrous matrix produced by the process of Example 2, as the adhesive. The processes of bonding and forming the shaped article occurred simultaneously. The device used for this process was a heated molding contour press with mating top and bottom forming molds, as shown in FIG. 3 below. The initial substrate dimensions were as follows:

| Moldable Foam | |
|---|---|
| Area Dimension (inches): | 20 × 24 |
| Thickness (inches): | 2 |
| Woven Fabric | |
| Area Dimension (inches): | 20 × 24 |
| Thickness (inches): | 0.008-0.012 |
| Adhesive Non-fibrous Matrix | |
| Area Dimension (inches): | 20 × 24 |
| Weight per unit area (ounce/yard$^2$): | 1.00 |

The three substrates were pre-assembled and layered prior to being inserting into the heated molding press, as follows:

| Bottom Layer: | Moldable Foam |
|---|---|
| Middle Layer: | Adhesive Non-fibrous Matrix |
| Top Layer: | Woven Fabric |
| Bonding Plate/Mold Temperatures (° F.): | |
| Top Plate: | 350-360 |
| Bottom Plate: | 180-200 |
| Bond Line Temp.: | 320-330 |

The pre-assembled three-layer composite was placed in the molding press, and the press was then closed using hydraulic pressure. The foam was contoured by compressing specific regions to a greater extent than others, conforming to the shape of the mold. The resultant, contoured foam composite was different in density throughout its mass. The more compressed regions was thinner in thickness and higher in density, while the less compressed regions was thicker and lower in density. The compression, and resultant forming, under heat of the thermoformable, moldable foam was permanent with minimal elastic recovery of the contoured foam composite. The shape of the woven fabric and the adhesive matrix followed the contour of the foam-surface, with negligible dimensional changes. The heat of the forming process simultaneously activated the thermoplastic adhesive matrix. Heat and pressure melted the adhesive matrix, facilitating penetration of the adhesive into the compressed foam. Upon cooling, the adhesive solidifies and stabilized the newly produced composite structure. The heated molding press remained closed under pressure for a cycle time of 35-40 seconds, and it was cooled before being released. The layered composite was then removed and placed on a cool surface, and allowed to further cool at room temperature. The result was a permanently molded and bonded foam composite with permanently shaped areas.

EXAMPLE 4

Figure 4:
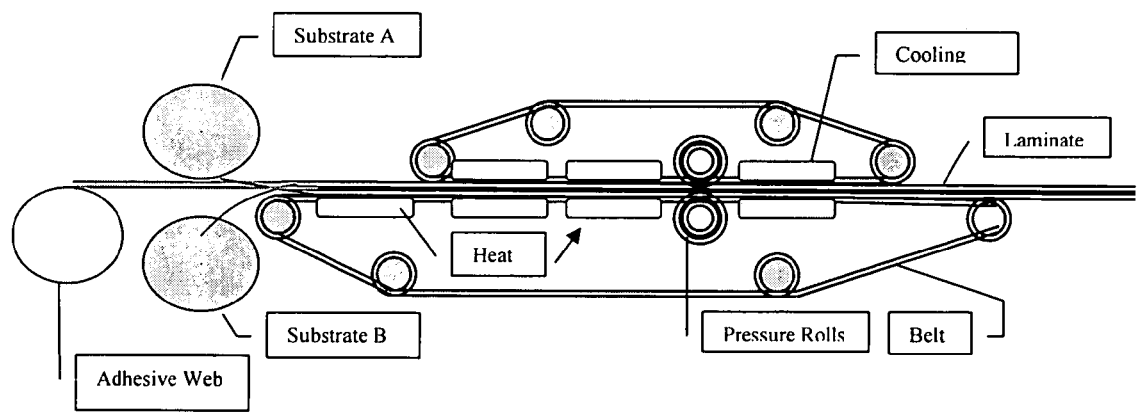
FIG. 4 illustrates a Continuous Fusing Process for producing a laminate, consisting of passing an ADHESIVE WEB between SUBSTRATE A and SUBSTRATE B.; the resulting structure is subjected to HEAT and then COOLING while passing on a BELT between PRESSURE ROLLS, to thereby provide the resulting LAMINATE.

Bonding Fabric to a Pre-shaped Foam Using Infrared to Activate the Thermoplastic Adhesive Matrix Polyurethane foam shaped in the form of a seat cushion was bonded to a woven polyester (polyethylene-terephthalate) upholstery fabric using as an adhesive PEBAX® type 3533 elastic polyamide block copolymer (manufactured by Atochem), in the form of a stereoreticulated non-fibrous matrix, produced by the process of Example 1. The processes of bonding and forming occurred simultaneously as follows. This process comprised three inline sequential and semi-automated steps that were: 1) Positioning, 2) Activating, and 3) Assembly & Cooling (See FIG. 4 for reference).

A jig with a top surface that matched the shape of the bottom polyurethane foam piece carried the subassembly through three indexed stations of the process, accordingly. The foam was a single piece with overall dimensions of approximately 20"×20"×3". All surfaces were pre-contoured and fixed in position. The fabric was a woven polyester seat cushion fabric, but it can be of various types. The adhesive used was a polyamide block copolymer in the form of a stereo reticulated thermoplastic non-fibrous adhesive matrix.

Step 1→Positioning:

The shaped foam cushion was positioned on a tracking jig that will carry the subassembly through to completion. A single sheet of the non-fibrous adhesive matrix was laid squarely on top of the shaped piece of foam.

Step 2→Activation:

The tracked jig moved the adhesive matrix-covered foam subassembly into an indexed position under Infrared heating banks for activation, to melt the adhesive matrix. The Infrared Heating Banks were located 3-6 inches above the top of the adhesive matrix/foam subassembly, and arranged in such a way as to provide optimum distribution of heat for the particular contoured shape. The adhesive layer, at the top of the subassembly, was exposed to the Infrared Heaters for 20-30 seconds, or until the desired temperature for activation of the adhesive matrix, in this case 320-330 Degrees F., was reached across the entire area of the adhesive matrix.

Step 3→Assembly and Cooling:

Immediately following activation and prior to allowing the adhesive to cool and solidify, the jig moved to the 3$^{rd}$ position where the fabric layer was added on top of the activated adhesive matrix. A flexible, cooled bladder was lowered onto the fabric. The bladder positioned the fabric and adhesive matrix tightly around the contoured shape of the foam while also cooling the molten adhesive, thereby allowing the adhesive to solidify and set. The bladder acted as both a cooling and a forming tool. The bladder was then lifted, and the bonded composite of foam and fabric was complete.

EXAMPLE 5

Bonding of a Wet-Suit Composite

FIG. 5 shows the schematic of a commercial flat press continuous fusing bonder.

An elastic Lycra® knit fabric and a polyester block copolymer adhesive stereoreticulated non-fibrous adhesive matrix produced by the process of Example 2, were fed together with a supply of 3/16" thick Neoprene rubber sheet, into a flat-press manufactured by the Reliant Company, as shown above in FIG. 5. The flat press bonder comprises an upper and lower Teflon® polytetraflouro-ethylene (PTFE) coated conveyer belt. The upper belt was heated to 350° F. to achieve a bond line temp of above 335° F. The lower belt was maintained just below 250° F., below the melting temperature of the adhesive.

All of the substrates to be bonded were supplied as rollstock. The Neoprene rubber, as the bottom layer was conveyed by the lower and cooler conveyer belt. The reticulated adhesive non-fibrous matrix, produced according to the process of Example 2, was positioned on top of the Neoprene rubber sheet covered by the Lycra® knit fabric. The Teflon® PTFE coated conveyer belts were running at identical speeds at a space [gap] designed to keep all of the substrates under constant pressure with each other. Heat was driven from the upper, hot belt through the Lycra® fabric into the adhesive matrix. After melting the adhesive matrix, the multi-layer composite entered the cooling section of the bonder. The cooled adhesive matrix was now permanently bonded into an elastomeric multi-layer composite, which emerged from the conveyer system of the bonder, then progressing to a winder to collect the final composite product.

Having described our invention, what we desire to claim is:

1. A laminate comprising at least one non-fibrous adhesive layer positioned between a plurality of substrates, the non-fibrous adhesive layer comprising a stereo reticulated, continuous, non-fibrous matrix formed from a polymeric material.

2. The laminate of claim 1, wherein the stereo reticulated, continuous non-fibrous matrix is an integral structure wherein a multitude of tissue-like branches are joined together to provide integrity to said non-fibrous matrix.

3. The laminate of claim 1, wherein the substrates comprise at least one fibrous layer.

4. The laminate of claim 1, wherein the continuous non-fibrous matrix is formed from a polymeric material.

5. The laminate of claim 4, wherein the polymeric material is an elastomer.

6. The laminate of claim 5, wherein the elastomer is a polyamide, a polyester, or a blend of one or more of said elastomers.

* * * * *